March 16, 1943. H. G. ROGERS ET AL 2,313,891
APPARATUS FOR APPLYING LIGHT-POLARIZING MATERIAL TO CURVED SURFACES
Filed May 20, 1942   3 Sheets-Sheet 1

Howard G. Rogers and
Lewis W. Chubb, Jr.
INVENTORS

BY Donald L. Brown
Attorney

March 16, 1943.  H. G. ROGERS ET AL  2,313,891
APPARATUS FOR APPLYING LIGHT-POLARIZING MATERIAL TO CURVED SURFACES
Filed May 20, 1942  3 Sheets-Sheet 2

Howard G. Rogers
Lewis W. Chubb, Jr.
INVENTORS

BY Donald L. Brown
Attorney

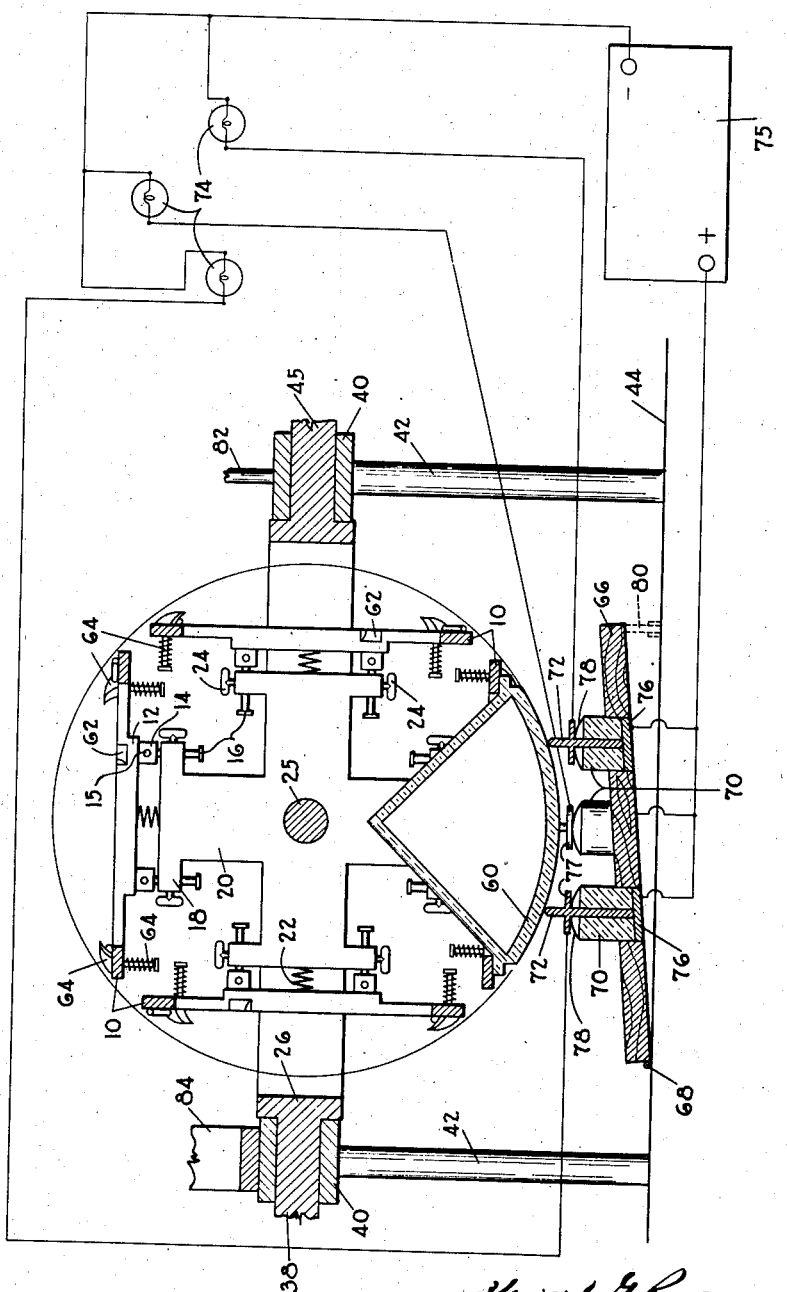

Patented Mar. 16, 1943

2,313,891

UNITED STATES PATENT OFFICE 2,313,891

APPARATUS FOR APPLYING LIGHT-POLARIZING MATERIAL TO CURVED SURFACES

Howard G. Rogers, Wellesley Hills, and Lewis W. Chubb, Jr., Sharon, Mass., assignors to Polaroid Corporation, Cambridge, Mass., a corporation of Delaware Application May 20, 1942, Serial No. 443,740

26 Claims. (Cl. 91—36)

This invention relates to apparatus for applying a material to curved surfaces, and more particularly to apparatus for applying simultaneously to the surface of a plurality of spherically curved lenses a coating of predeterminedly oriented organic plastic.

The present invention relates particularly to improvements in the apparatus shown and described in the copending application of Howard G. Rogers, Serial No. 374,512, filed January 15, 1941, now Patent No. 2,284,590, issued May 26, 1942. Said application discloses a method of applying a coating of a predeterminedly oriented organic plastic to a surface of a spherically curved lens, such particularly as a headlight lens, and it discloses also apparatus for carrying out this method in connection with a single lens or headlight.

It is a particular object of the present invention to provide apparatus whereby the method of said copending Rogers application may be carried out simultaneously on a multiplicity of lenses or headlights.

Another object of the invention is to provide apparatus whereby a coating of a predeterminedly oriented organic plastic may be applied simultaneously to the lenses of each of four automobile headlights of the sealed beam type.

Other objects of the invention are to provide means for insuring uniformity in the coating applied to said lenses, and means for accurately mounting and centering said lenses within the apparatus of the invention to insure uniformity of the coating applied thereto, and means for controlling the amount of plastic applied to said lenses.

Still further objects and advantages will in part appear and in part be pointed out in the course of the following detailed description of one embodiment of the invention, which is given as a non-limiting example, in connection with the accompanying drawings, in which.

Figure 1:
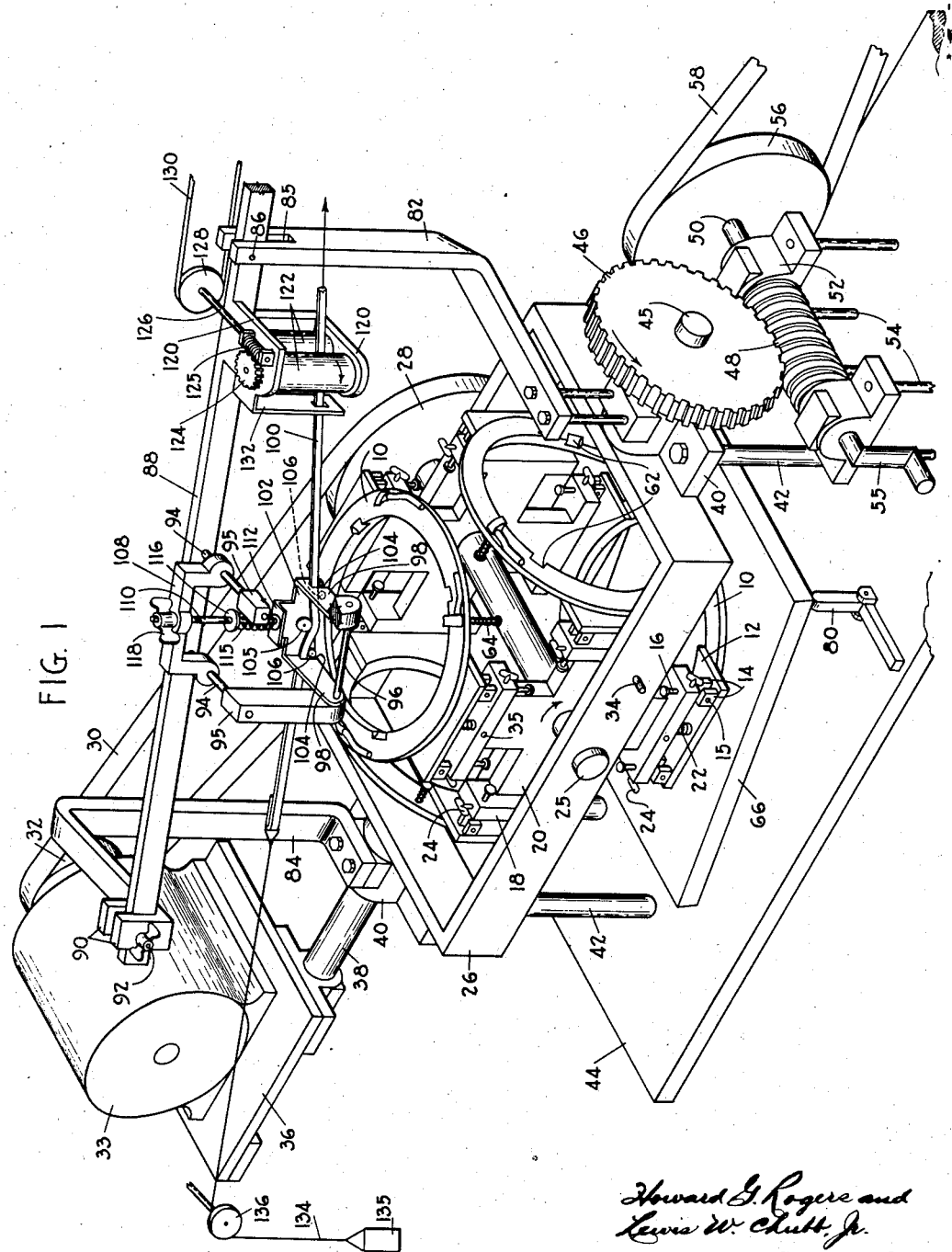
Figure 1 is a view in perspective of apparatus embodying one form of the invention.
Figure 3:
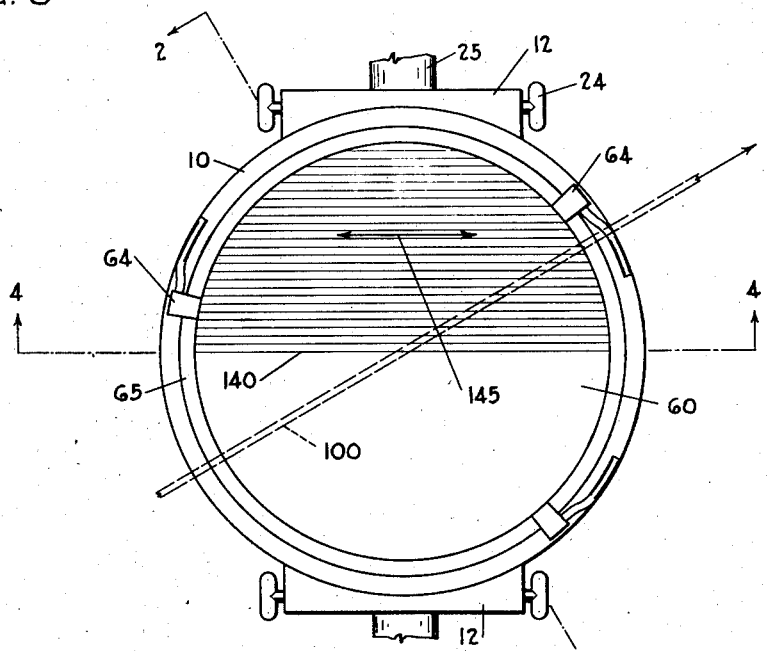

Fig. 3 is a partial top view of the apparatus shown in Fig. 1 and illustrating the operation thereof in applying a coating to a headlight lens, and Fig. 4 is a partial section of the embodiment of the invention shown in Fig. 1 taken approximately on the line 4—4 in Fig. 3, and illustrating other details of the invention, including particularly the means for mounting and centering sealed beam headlights in the apparatus.

This invention is particularly concerned with problems in connection with the production of light-polarizing headlights for automobiles. It has been discovered that automobile headlights of the sealed beam type or other spherically curved lenses may be readily converted to light polarizers by applying to a surface thereof a molecularly oriented coating of a suitable transparent plastic which may be converted into light-polarizing material by developing a suitable dichroic stain therein as by dyeing or staining with a dichroic dye. Said copending Rogers application discloses a method for applying such a coating to a spherically curved lens by depositing on the surface thereof a multiplicity of contiguous and at least partially overlying particles of a suitable plastic, and predeterminedly orienting the molecules of said plastic simultaneously with the application thereof to said lens. Said application discloses also apparatus for carrying out this method in connection with a single lens. The present invention is particularly directed to providing improved apparatus whereby the method of said copending Rogers application may be carried out simultaneously upon a multiplicity of lenses or bulbs. Other cognate subject matter will be found in another copending application of Howard G. Rogers, Serial No. 371,561, filed December 24, 1940.

The device of the present invention comprises a frame or holding and mounting means adapted to receive and properly position a plurality, for example four, spherically curved lenses or so-called "sealed-beam" automobile headlights. Headlights of this kind may differ slightly one from another in their structure, except for the curvature of the lens surface itself. Accordingly, the lens mounting means of the present invention is preferably constructed so as to be adaptable to variations in the headlight structure and, as will be explained in greater detail hereinafter, means are provided for altering slightly the positions of certain of the lens holding elements to insure that the surface of each lens to be coated is accurately and properly positioned in the device.

Referring to the drawings, each of the four ring members 10 is adapted to hold a spherically curved lens or headlight of the sealed beam type, as is shown in Figs. 3 and 4. Each of rings 10 is provided at opposite sides with a flange 12 integrally formed therewith or rigidly secured thereto. Affixed to each flange 12 on the inner side thereof are a plurality of yokes or pairs of trunnions 14, each yoke having a pin 15 journaled therein. Pins 15 serve as pivotal connections between trunnions 14 and pins 16 which may be either integral with pins 15 or connected therewith as by a forced fit and which are in turn freely slidable within blocks 18 formed integrally with or rigidly secured to cross members 20. Pins 16 are preferably quite loosely mounted in blocks 18 to permit adjustment of rings 10 as hereinafter described. Springs 22 between each of flanges 12 and blocks 18 serve to urge them apart, and thumb screws 24 act to lock pins 16 with respect to blocks 18 after rings 10 have been positioned and thus to secure rings 10 in fixed position with respect to cross members 20.

Cross members 20 are keyed or otherwise secured to shaft 25 journaled within frame 26 and carrying at one end a pulley 28 driven through belt 30 and pulley 32 by motor 33. Cross members 20 and shaft 25 together with their associated holder or mounting elements form the carrier assembly, and there are preferably provided means for locking them against rotation with respect to frame 26, such for example as plug 34 slidably mounted within frame 26 and adapted to engage one of apertures 35 in blocks 18. This locking means serves to prevent motion of the lens holders about the axis of rotation during the adjustment of each of the holder rings 10.

Motor 33 is preferably mounted for rocking motion with frame 26. It may be affixed to platform 36 mounted for rotation with shaft 38, which is journaled in one of a pair of bearings 40 and secured to frame 26. Bearings 40 are in turn fixedly mounted by means of legs 42 to any suitable base 44. At its opposite side, frame 26 is similarly secured to a shaft 45 coaxial with shaft 38 and similarly journaled in the other of bearings 40. Shaft 45 has keyed or otherwise secured thereto a gear 46 meshing with worm gear 48 secured on shaft 50 journaled within bearings 52, which, like bearings 40, are mounted on base member 44 by means of legs 54. Shaft 50 is shown as provided at one end with a hand crank 55 and at its other end with a pulley 56 driven through belt 58 by any suitable motor means, not shown.

The axis of rotation of shafts 38 and 45 should intersect the axis of rotation of shaft 25, and the point at which they intersect should coincide with the center of curvature of the lenses or headlight bulbs mounted within rings 10. The mechanism for obtaining this condition is shown particularly in Figs. 3 and 4 and will now be described.

The number of bulbs which may be handled at one time by the apparatus of the invention depends upon the size of the bulb and the radius of curvature thereof. With the majority of bulbs of this type currently being manufactured, four may be taken at one time, and four rings 10 are accordingly provided in the illustrated embodiment of the invention. It is desirable in a headlighting system employing polarized light that all headlights emit light of the same polarization characteristics, and it is accordingly essential that each bulb be predeterminedly positioned within its mounting ring 10. To this end each of rings 10 is provided with a plurality of notches 62 adapted to receive the locating bosses commonly provided on the exterior of the reflector portion of headlights of the sealed beam type. The bulbs are then locked in position by means of a plurality of spring-loaded clips 64 mounted in each of rings 10 and adapted to engage bead 65 which is also a conventional part of headlights of this type.

Since bulbs of the sealed beam type are manufactured in quantity, they are subject to some degree of minor variations and irregularities in shape. It is important for the purpose of the invention that means be provided for compensating for such variation and for insuring accurate mounting and centering of the bulbs to be coated within the apparatus. Such compensating and centering means are shown particularly in Fig. 4.

Plate 66, which may be of wood or any other suitable rigid material, is hingedly connected at 68 with base 44 and carries three insulating bushings 70 each having slidably mounted therein a metal prong 72. Each of prongs 72 is connected to one terminal of one of three electric lamps 74. The other terminal of each of said lamps is connected through a suitable source of energy 75 to one of three contact plates 76 carried by plate 66. Each of prongs 72 is provided with a shoulder 77 adapted to engage a light spring 78 of sufficient strength to urge prongs 72 upwards and out of engagement with plates 76. It will be seen that when the pressure of any of springs 78 is overcome and its associated prong 72 pushed downwards into contact with its complementary plate 76, the circuit to the appropriate lamp 74 will be closed and the lamp will be lighted. A suitable cam or stop element 80 is provided on base 44 and adapted to elevate plate 66 to a predetermined height such that when any prong 72 is forced downward as far as it will go within its insulator 70, the distance between its upper end and the point at which the axes of rotation of shaft 25 and shafts 38 and 45 intersect will be equal to the radius of curvature of whatever lens is to be treated by the apparatus of the invention.

When it is desired to utilize the apparatus, the requisite number of bulbs is first mounted within retaining rings 10 by means of clips 64. Each bulb and its holding ring is then in turn accurately positioned by means of the mechanism just described. The carrier assembly is rotated until a bulb is in the lowermost position shown in Fig. 4, and the assembly is then locked in that position by means of plug 34. Plate 66 is then raised by means of cam 80, and thumb screws 24 are released until the bulb and ring drop of their own weight and due to force exerted by spring 22. The weight of the bulb and its associated carrying elements is sufficient to overcome the pressure of springs 78. The bulb is manipulated until it is supported evenly by all three of prongs 72, at which juncture the circuits of all three of lamps 74 will be closed and all three of said lamps will automatically be lighted. When this condition is obtained the result will be that the bulb is mounted with its surface in precisely the proper relation to the point of intersection between the two axes of rotation of the apparatus, and it is then secured in that position by means of thumb screws 24. Plate 66 is then lowered and plug 34 released, and the carrier assembly rotated until another bulb is in the lowermost position shown in Fig. 4 so that the centering operation may be repeated successively for each of the four bulbs. It is preferable to retain frame 28 in the same position throughout the entire operation of locating all the bulbs.

The coating head of the apparatus of the invention may take any of a variety of forms, including for example that shown and described in said copending Rogers applications. It is highly desirable that the inertia of the coating head be kept at a minimum. Unless the inertia of the head is kept to a minimum, an uneven coating is obtained. While many forms of suitable coating heads may be employed and while modifications in the method of applying the plastic layer to the spherically curved lenses may compel a departure from the form of coating head shown and described, the mechanism shown in the drawings and hereinafter described has been found satisfactory, especially where the plastic applied to the lens surfaces is supplied from a rapidly moving, continuous plastic ribbon or belt.

Brackets 82 and 84 may be mounted in any convenient way on base 44, as for example by securing one to each of bearings 40 in the manner shown in Fig. 1. Bracket 82 is provided with a forked upper end 85 wherein is pivotally mounted, as by means of pin 86, a bar 88, the other end of which is adapted to be removably secured to bracket 84 in any convenient way, as for example by ears 90 and thumb screw 92. Bar 88 is preferably provided with suitable counterbalance means, not shown, adjacent its right-hand end as viewed in Fig. 1, in such manner that its left-hand end will tend to rise when thumb screw 92 is released.

Mounted in bar 88 is a pair of horizontal rods or arms 94 at the end of each of which is a second vertical arm 95 forming in combination therewith a bell crank lever. At their lower ends arms 95 are joined by a shaft 96 serving as a pivotal mounting for another pair of arms 98 joined at their opposite ends by plate element 102. In this embodiment of the apparatus of the invention, the plastic to be coated on the surface of the bulbs, preferably polyvinyl alcohol, is provided in the form of a long continuous strip 100 passing through guide slots 104 in arms 98 and between idler wheels 105 and 106 mounted on plate 102. For preferred results, arms 98 and the elements associated therewith for movement about shaft 96 should be as light as possible in order to provide as little inertia as possible.

There are also provided means for positioning strip 100 with respect to the surfaces of the bulbs being coated and means for cushioning the contact between said strip and said bulb surfaces. Rods 94 carry a yoke member 108 having threaded therein one end of an elongated bolt 110. At its opposite end bolt 110 passes through a tab 112 formed, for example, by bending a portion of plate 102, and the head 114 of bolt 110 serves as a stop to limit the amount of downward movement of plate 102 as its arms 98 pivot on shaft 96. There are also provided means for controlling upward movement of plate 102 which comprise spring 115 bearing against the upper surface of tab 112 and controlled as by means of a knurled nut 116 threaded on bolt 110. If desired, there may also be provided a lock nut 118 at the upper end of bolt 110.

Bar 88 may also carry mechanism for drawing plastic strip 100 through the coating head. As shown in Fig. 1, the mechanism may comprise a pair of arms 120 mounted in any suitable way on bar 88 and carrying therebetween a pair of pressure rolls 122 driven, for example, through pinion gear 124, worm gear 125, shaft 126, pulley 128 and belt 130 by any suitable motor means, not shown. It has been found particularly desirable to make rolls 122 of knurled metal in order to insure proper gripping of strip 100. If desired, there may also be provided further guide means for strip 100 such as a suitably slotted plate 132 mounted in any convenient way on one of arms 120. At its other end strip 100 is preferably provided with any suitable braking or loading means, such as for example as cord 134, weight 135 and pulley 136 mounted in any convenient way.

It is believed that the operation of the illustrated embodiment of the invention will be readily understood from the foregoing description. According to the preferred practice in an automobile headlighting system employing polarized light, each headlight will emit light vibrating at an angle of approximately 45 degrees to the horizontal. It is accordingly important to the purpose of the present invention that the molecules of the plastic coating applied to the headlights be so oriented that when the plastic is converted to a light polarizer it will transmit light of the desired polarization characteristics. To produce this result the molecules should be oriented in substantially parallel planes when viewed in a direction substantially perpendicular to a plane defined by the tangents to the center of the lens. Thus in Fig. 3, which shows the apparatus of the invention applying a plastic coating 140 to a headlight lens 60, the direction of molecular orientation should be substantially parallel to arrow 145. This result is achieved by proper adjustment of a number of variables, including the speed of motion of the holder about each of the two axes whereon it rotates, and the speed and direction of motion of strip 100 with respect to said axes of rotation, as will be described.

In a typical example of the operation of the apparatus of the invention, four bulbs are first loaded into the apparatus and properly positioned in the manner already described. Then with the apparatus in the position illustrated in Figs. 1 and 4, bar 88 is lowered to its lowest position and secured by thumb screw 92. Bolt 110 is adjusted until the lower edge of strip 100 is just tangent to the surface of the uppermost bulb, and then after the bulb is rotated out from beneath it, it is further lowered to a predetermined extent, for example .05 inch. Spring 115 should also be adjusted to the desired compression, for example 8 pounds. Frame 26 is then rotated by means of crank 55 until the entire surface of the uppermost bulb is in front of or behind the coating head.

Beginning with the apparatus in the position last described, the coating operation is then carried out by applying power substantially simultaneously to shafts 25, 50 and 126, thus simultaneously rotating the carrier assembly on its two axes and drawing strip 100 through the coating head. These three motions all take place at different speeds, for example approximately eight inches per minute for strip 100, approximately 200 R. P. M. for shaft 25, and approximately seven inches per minute for the motion about the axis of shafts 38 and 45, measured along the circumference of the bulbs within the carrier.

Figure 2:
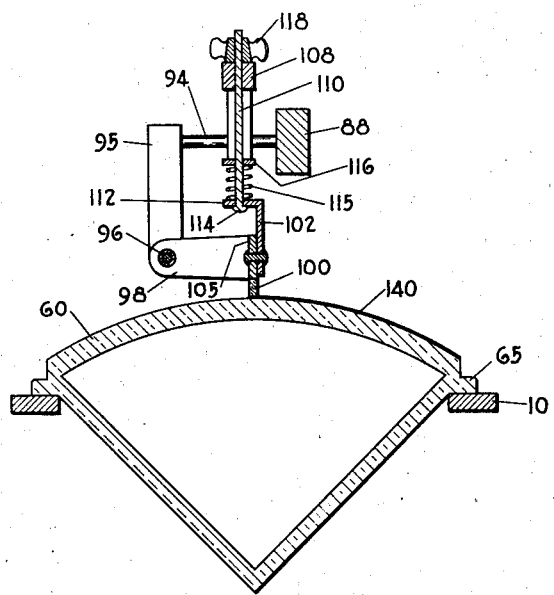
Fig. 2 is a detailed sectional view taken approximately at right angles to the view of Fig. 1 and approximately on the line 2—2 in Fig. 3, and showing the apparatus of the invention applying a coating to the lens of a headlight of the sealed beam type.

As a result of the difference in speed of motion of the lens and coating head, and of the difference in their directions of motion, frictional heat is generated at their point of contact which softens the plastic material of the belt and causes minute particles thereof to adhere to the lens surface in a series of strips, as is indicated diagrammatically by the parallel lines across the face of bulb 60 in Fig. 3. It appears, moreover, that each particle as it is deposited on the surface is extended or stretched and caused to coalesce with the other particles and to adhere to the lens surface in the form of a thin, substantially homogeneous film, as is indicated at 140 in Fig. 2. Furthermore, this stretching results in orientation of the molecules in the particles in the manner indicated by arrow 145 in Fig. 3. Figs. 2 and 3 show substantially the midpoint of this operation of applying coating 140 on the surface of bulb 60, and the operation is continued until the entire surface of each bulb has been coated. Under some conditions a single coating will be enough, but for preferred results a second coating may be applied by repeating the above operation under substantially the same conditions.

It will be understood that in order to secure in coating 140 the desired condition of molecular orientation indicated in Fig. 3, certain important requirements should always be observed in the construction of the apparatus of the invention. The first has already been pointed out, namely, that the axis of shaft 25 should be perpendicular to the axis of shafts 38 and 45 and should intersect therewith at a predetermined point. Second, each lens or headlight should be so positioned in the lens holder that its surface coincides with the surface of a theoretical sphere having its center at the point at which the axes of shaft 25 and shafts 38 and 45 intersect. Third, each lens or headlight should be so mounted in the carrier assembly that the axis of shaft 25 does not intersect any part of the surface thereof to be coated. This requirement may be fulfilled conveniently as shown in Fig. 1 by so mounting each lens or headlight that a plane including the axis of shafts 38 and 45 and perpendicular to the axis of shaft 25 passes through the center of each lens.

After the plastic coating has been applied to the bulbs in the manner above described, it may be converted into a light-polarizing film by one of several processes. For example, it may be dyed with a suitable dichroic dye or stain, such as a water solution of iodine and one or more iodides, for example ammonium iodide, in the manner disclosed in greater detail in Patent No. 2,237,567. Alternatively, the plastic coating may be treated in the manner described in Patent No. 2,173,304. In the latter case a catalyst, such for example as ammonium iodide, is preferably added to strip 100 before it is applied to the bulb. Then, after the coating has been applied, heating the bulb and coating to a temperature of approximately 175 degrees C. will cause a conversion of some of the plastic molecules into dichroic molecules in the manner described in said patent. A further, more comprehensive discussion of this phase of the subject will be found in the above mentioned copending application of Howard G. Rogers, Serial No. 371,561, filed December 24, 1940.

Since certain changes may be made in the above apparatus and different embodiments of the invention could be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. Apparatus for coating a plurality of spherically curved surfaces comprising, in combination, holder means for a plurality of elements, each having a spherically curved surface, means for mounting said holder for rotation about a predetermined axis, said holder positioning said elements so that said axis passes through substantially the center of curvature of each said surface, means for rotating said holder, means for moving said holder simultaneously about a second axis passing through substantially the center of curvature of said surfaces, means providing a coating element, and means for causing said coating element to bear with relatively even force against the said surfaces as said holder is rotated.

2. Apparatus for coating a plurality of spherically curved surfaces comprising, in combination, holder means for a plurality of elements, each having a spherically curved surface, means for mounting said holder for rotation about a predetermined axis, said holder positioning said elements so that said axis passes through substantially the center of curvature of each said surface, means for rotating said holder, means for moving said holder simultaneously about a second axis passing through substantially the center of curvature of said surfaces and substantially perpendicular to said first-mentioned axis, means providing a coating element, and means for causing said coating element to bear with relatively even force against the said surfaces as said holder is rotated.

3. Apparatus for coating a plurality of spherically curved surfaces comprising, in combination, holder means for a plurality of elements, each having a spherically curved surface, means for mounting said holder for rotation about a predetermined axis, said holder positioning said elements so that said axis passes through substantially the center of curvature of each said surface, means for rotating said holder about said axis at a predetermined speed, means for moving said holder simultaneously and at a speed substantially less than said speed of rotation about a second axis passing through subtantially the center of curvature of said surfaces and substantially perpendicular to said first-mentioned axis, means providing a coating element, and means for causing said coating element to bear with relatively even force against the said surfaces as said holder is rotated.

4. Apparatus for coating a plurality of spherically curved surfaces comprising, in combination, holder means for a plurality of elements, each having a spherically curved surface, means for mounting said holder for rotation about a predetermined axis, said holder positioning said elements so that said axis passes through substantially the center of curvature of each said surface, means for rotating said holder, means for moving said holder simultaneously about a second axis passing through substantially the center of curvature of said surfaces, said second axis passing also successively through substantially the center point of each spherically curved surface as said holder rotates, means providing a coating element, and means for causing said coating element to bear with relatively even force against the said surfaces as said holder is rotated.

5. Apparatus for coating a plurality of spherically curved surfaces comprising, in combination, holder means for a plurality of elements, each having a spherically curved surface, means for mounting said holder for rotation about a predetermined axis, said holder positioning said elements so that said axis passes through substantially the center of curvature of each said surface and is substantially parallel to the planes defined by the tangents to the centers of each said surface, means for rotating said holder, means for moving said holder simultaneously about a second axis passing through substantially the center of curvature of said surfaces and substantially perpendicular to said first-mentioned axis, means providing a coating element, and means for causing said coating element to bear with relatively even force against the said surfaces as said holder is rotated.

6. Apparatus for coating a plurality of spherically curved surfaces comprising, in combination, holder means for a plurality of elements, each having a spherically curved surface, means for mounting said holder for rotation about a predetermined axis, said holder positioning said elements so that said axis passes through substantially the center of curvature of each said surface, means for rotating said holder about said axis at a predetermined speed, means for moving said holder simultaneously and at a speed substantially less than said speed of rotation about a second axis passing through substantially the center of curvature of said surfaces and substantially perpendicular to said first-mentioned axis, means providing a coating element, means for moving said coating element with respect to said holder, and means for causing said coating element to bear with relatively even force against the said surfaces as said holder is rotated.

7. Apparatus for coating a plurality of spherically curved surfaces comprising, in combination, holder means for a plurality of elements, each having a spherically curved surface, means for mounting said holder for rotation about a predetermined axis, said holder positioning said elements so that said axis passes through substantially the center of curvature of each said surface, means for rotating said holder, means for moving said holder simultaneously through an angle at least substantially that subtended by the edge of the largest of said curved surfaces about a second axis passing through substantially the center of curvature of said surfaces, means providing a coating element, means for moving coating element with respect to said holder, and means for causing said coating element to bear with relatively even force against the said surfaces as said holder is rotated.

8. Apparatus for coating a plurality of spherically curved surfaces comprising, in combination, holder means for a plurality of elements, each having a spherically curved surface, means for mounting said holder for rotation about a predetermined axis, said holder positioning said elements so that said axis passes through substantially the center of curvature of each said surface and is substantially parallel to the planes defined by the tangents to the centers of each said surface, means for rotating said holder relatively rapidly about said axis, means for moving said holder simultaneously and relatively slowly about a second axis passing through substantially the center of curvature of said surfaces and substantially perpendicular to said first-mentioned axis, means providing a coating element, and means for causing said coating element to bear with relatively even force against the said surfaces as said holder is rotated.

9. Apparatus for applying to a plurality of spherically curved surfaces a predeterminedly oriented coating of a plastic material, comprising in combination, holder means for so positioning a plurality of elements having spherically curved surfaces that their centers of curvature fall substantially upon a single point, means for rotating said holder means relatively rapidly about a predetermined axis, means for simultaneously moving said holder means relatively slowly about a second predetermined axis, only said second axis intersecting the said surfaces as said holder means is rotated, means providing a coating element comprising said plastic material, and means for causing said coating element to bear with relatively even force against the spherically curved surfaces of elements held in said holder means.

10. Apparatus for applying to a plurality of spherically curved surfaces a predeterminedly oriented coating of a plastic material, comprising in combination, holder means for so positioning a plurality of elements having spherically curved surfaces that their centers of curvature fall substantially upon a single point, means for rotating said holder means relatively rapidly about a predetermined axis, means for simultaneously moving said holder means relatively slowly about a second predetermined axis, only said second axis intersecting the said surfaces as said holder means is rotated, both of said axes passing through substantially the centers of curvature of said surfaces, means providing a coating element comprising said plastic material, and means for causing said coating element to bear with relatively even force against the spherically curved surfaces of elements held in said holder means.

11. Apparatus for applying to a plurality of spherically curved surfaces a predeterminedly oriented coating of a plastic material, comprising in combination, holder means for so positioning a plurality of elements having spherically curved surfaces that their centers of curvature fall substantially upon a single point, means for rotating said holder means relatively rapidly about a predetermined axis, means for simultaneously moving said holder means relatively slowly about a second predetermined axis, only said second axis intersecting the said surfaces as said holder means is rotated, means providing a coating element comprising said plastic material, means for moving said plastic material across that surface with which it is in contact, and means for causing said coating element to bear with relatively even force against the spherically curved surfaces of elements held in said holder means.

12. Apparatus for applying to a plurality of spherically curved surfaces a predeterminedly oriented coating of a plastic material, comprising in combination, holder means for so positioning a plurality of elements having spherically curved surfaces that their centers of curvature fall substantially upon a single point, means associated with said holder means for insuring the proper positioning of said spherically curved elements therein, means for rotating said holder means relatively rapidly about a predetermined axis, means for simultaneously moving said holder means relatively slowly about a second predetermined axis, only said second axis intersecting the said surfaces as said holder means is rotated, means providing a coating element comprising said plastic material, and means for causing said coating element to bear with relatively even force against the spherically curved surfaces of elements held in said holder means.

13. Apparatus for applying to a plurality of spherically curved surfaces a predeterminedly oriented coating of a plastic material, comprising in combination, holder means for so positioning a plurality of elements having spherically curved surfaces that their centers of curvature fall substantially upon a single point, means associated with said holder means and comprising a plurality of movable contacts for insuring the proper positioning of said spherically curved elements therein, means for rotating said holder means relatively rapidly about a predetermined axis, means for simultaneously moving said holder means relatively slowly about a second predetermined axis, only said second axis intersecting the said surfaces as said holder means is rotated, means providing a coating element comprising said plastic material, and means for causing said coating element to bear with relatively even force against the spherically curved surfaces of elements held in said holder means.

14. Apparatus for applying to a plurality of spherically curved surfaces a predeterminedly oriented coating of a plastic material, comprising in combination, holder means for so positioning a plurality of elements having spherically curved surfaces that their centers of curvature fall substantially upon a single point, means associated with said holder means and comprising a plurality of movable contacts in circuit with indicating means for insuring the proper positioning of said spherically curved elements therein, means for rotating said holder means relatively rapidly about a predetermined axis, means for simultaneously moving said holder means relatively slowly about a second predetermined axis, only said second axis intersecting the said surfaces as said holder means is rotated, means providing a coating element comprising said plastic material, and means for causing said coating element to bear with relatively even force against the spherically curved surfaces of elements held in said holder means.

15. Apparatus for applying to a plurality of spherically curved surfaces a predeterminedly oriented coating of a plastic material, comprising in combination, holder means for so positioning a plurality of elements having spherically curved surfaces that their centers of curvature fall substantially upon a single point, means for rotating said holder means relatively rapidly about a predetermined axis, means for simultaneously moving said holder means relatively slowly about a second predetermined axis, only said second axis intersecting the said surfaces as said holder means is rotated, means providing a coating element comprising said plastic material, and means comprising an adjustable, pivotally mounted guide for causing said coating element to bear with relatively even force against the spherically curved surfaces of elements held in said holder means.

16. Apparatus for applying to a plurality of spherically curved surfaces a predeterminedly oriented coating of a plastic material, comprising in combination, holder means for so positioning a plurality of elements having spherically curved surfaces that their centers of curvature fall substantially upon a single point, means for rotating said holder means relatively rapidly about a predetermined axis, means for simultaneously moving said holder means relatively slowly about a second predetermined axis, only said second axis intersecting the said surfaces as said holder means is rotated, means providing a coating element comprising said plastic material, and means comprising an adjustable, pivotally mounted, spring-depressed guide for causing said coating element to bear with relatively even force against the spherically curved surfaces of elements held in said holder means.

17. In combination, holder means for positioning a plurality of spherically curved lenses with their centers of curvature at substantially a common point, means to rotate said holder about an axis passing through said point, means for maintaining a plastic coating element in frictional contact with said lenses as said holder rotates, and means for so moving said holder that as it rotates substantially all portions of the surfaces of said lenses come in contact with said coating element.

18. In combination, holder means for positioning a plurality of spherically curved lenses with their centers of curvature at substantially a common point, means to rotate said holder about an axis passing through said point, means comprising an adjustable, resiliently mounted guide for maintaining a plastic coating element in frictional contact with said lenses as said holder rotates, and means for so moving said holder that as it rotates substantially all portions of the surfaces of said lenses come in contact with said coating element.

19. In combination, holder means for positioning a plurality of spherically curved lenses with their centers of curvature at substantially a common point, means for indicating whether said lenses are properly positioned in said holder, means to rotate said holder about an axis passing through said point, means for maintaining a plastic coating element in frictional contact with said lenses as said holder rotates, and means for so moving said holder that as it rotates substantially all portions of the surfaces of said lenses come in contact with said coating element.

20. In combination, holder means for positioning a plurality of spherically curved lenses with their centers of curvature at substantially a common point, means comprising a plurality of movable contacts in circuit with electrically responsive means for indicating whether said lenses are properly positioned in said holder, means to rotate said holder about an axis passing through said point, means for maintaining a plastic coating element in frictional contact with said lenses as said holder rotates, and means for so moving said holder that as it rotates substantially all portions of the surfaces of said lenses come in contact with said coating element.

21. In combination, holder means for positioning a plurality of spherically curved lenses with their centers of curvature at substantially a common point, means to rotate said holder about an axis passing through said point, means comprising a loading head having a minimum of inertia for maintaining a plastic coating element in frictional contact with said lenses as said holder rotates, and means for so moving said holder that as it rotates substantially all portions of the surfaces of said lenses come in contact with said coating element.

22. Apparatus for applying to a plurality of spherically curved surfaces a predeterminedly oriented coating of a plastic material, comprising in combination, holder means for so positioning a plurality of elements having spherically curved surfaces that their centers of curvature fall substantially upon a single point, means for rotating said holder means relatively rapidly about a predetermined axis, means for simultaneously moving said holder means relatively slowly about a second predetermined axis, only said second axis intersecting the said surfaces as said holder means is rotated, means providing a coating element comprising said plastic material, means for moving said plastic material across that surface with which it is in contact, and means comprising a light weight, pivotally mounted, spring loaded guide having a minimum of inertia for causing said coating element to bear with relatively even force against the spherically curved surfaces of elements held in said holder means.

23. In combination, holder means for positioning a plurality of spherically curved lenses with their centers of curvature at substantially a common point and comprising adjustable lens-engaging means, means for determining the proper adjustment of said last-mentioned means, means to rotate said holder about an axis passing through said point, means for maintaining a plastic coating element in frictional contact with said lenses as said holder rotates, and means for so moving said holder that as it rotates substantially all portions of the surfaces of said lenses come in contact with said coating element.

24. In combination, holder means for positioning a plurality of spherically curved lenses with their centers of curvature at substantially a common point and comprising adjustable lens-engaging means, means comprising a plurality of lens-engaging movable contacts in circuit with indicating means for determining the proper adjustment of said last-mentioned means, means to rotate said holder about an axis passing through said point, means for maintaining a plastic coating element in frictional contact with said lenses as said holder rotates, and means for so moving said holder that as it rotates substantially all portions of the surfaces of said lenses come in contact with said coating element.

25. In combination, holder means for positioning a plurality of spherically curved lenses with their centers of curvature at substantially a common point and comprising adjustable lens-engaging means, means providing a three-point suspension for each said lens for insuring proper positioning thereof for determining the proper adjustment of said last-mentioned means, means to rotate said holder about an axis passing through said point, means for maintaining a plastic coating element in frictional contact with said lenses as said holder rotates, and means for so moving said holder that as it rotates substantially all portions of the surfaces of said lenses come in contact with said coating element.

26. In combination, holder means for positioning a plurality of spherically curved lenses with their centers of curvature at substantially a common point, means including three contact elements for supporting successively each said lens as it is positioned in said holder, means to rotate said holder about an axis passing through said point, means for maintaining a plastic coating element in frictional contact with said lenses as said holder rotates, and means for so moving said holder that as it rotates substantially all portions of the surfaces of said lenses come in contact with said coating element.

HOWARD G. ROGERS.
LEWIS W. CHUBB, Jr.